(12) United States Patent
Lee et al.

(10) Patent No.: US 8,983,747 B2
(45) Date of Patent: Mar. 17, 2015

(54) POWER WHEELCHAIR AND BRAKE CONTROL METHOD OF THE POWER WHEELCHAIR

(75) Inventors: Hou-Hsien Lee, New Taipei (TW); Chang-Jung Lee, New Taipei (TW); Chih-Ping Lo, New Taipei (TW)

(73) Assignee: Zhongshan Innocloud Intellectual Property Services Co., Ltd., Guangdong (CN)

( * ) Notice: Subject to any disclaimer, the term of this patent is extended or adjusted under 35 U.S.C. 154(b) by 318 days.

(21) Appl. No.: 13/559,779

(22) Filed: Jul. 27, 2012

(65) Prior Publication Data

US 2013/0138315 A1 May 30, 2013

(30) Foreign Application Priority Data

Nov. 25, 2011 (TW) .............................. 100143264 A

(51) Int. Cl.
*G06F 7/70* (2006.01)
*B60T 8/1755* (2006.01)
*B60T 7/22* (2006.01)

(52) U.S. Cl.
CPC . *B60T 8/1755* (2013.01); *B60T 7/22* (2013.01)
USPC .................... 701/70; 701/71; 701/74; 701/75

(58) Field of Classification Search
CPC ......... B60T 8/1755; B60T 8/172; B60T 7/22; B60W 10/184; B60W 10/18
USPC ............. 180/65.6, 65.51, 907, 19.3; 700/253; 701/26, 23, 51, 70; 348/208.1; 297/338; 705/2; 280/304.1; 340/988; 477/115
See application file for complete search history.

(56) References Cited

U.S. PATENT DOCUMENTS

| 6,880,653 | B2 * | 4/2005 | Kanno ........................ 180/65.6 |
| 6,910,543 | B2 * | 6/2005 | Kanno et al. ................. 180/65.1 |
| 8,442,714 | B2 * | 5/2013 | Matsukawa et al. ............ 701/26 |
| 2002/0104698 | A1 * | 8/2002 | Kanno ........................ 180/65.6 |
| 2003/0098190 | A1 * | 5/2003 | Kanno et al. ................. 180/65.6 |
| 2008/0088707 | A1 * | 4/2008 | Iwaki et al. ................. 348/208.1 |
| 2009/0043440 | A1 * | 2/2009 | Matsukawa et al. ............ 701/25 |
| 2009/0055216 | A1 * | 2/2009 | Inaba et al. ....................... 705/2 |

* cited by examiner

*Primary Examiner* — Behrang Badii
(74) *Attorney, Agent, or Firm* — Novak Druce Connolly Bove + Quigg LLP

(57) ABSTRACT

In a brake control method of a power wheelchair, the power wheelchair includes an electronic gradienter, a brake sensor, a brake apparatus, and a brake controller. The electronic gradienter detects stability data of the power wheelchair to obtain a gradient angle and a gradient direction of the power wheelchair. When the gradient angle does not exceed a safety angle range, the brake controller controls the brake apparatus to brake the power wheelchair, and the brake sensor detects braking data of the power wheelchair. The method calculates a braking strength value for braking each wheel of the power wheelchair according to the gradient angle and the gradient direction of the power wheelchair when the brake operation on the power wheelchair is improper. The brake controller adjusts the brake apparatus to brake the power wheelchair according to the braking strength value of each of the wheels.

18 Claims, 4 Drawing Sheets

POWER WHEELCHAIR AND BRAKE CONTROL METHOD OF THE POWER WHEELCHAIR

BACKGROUND

1. Technical Field

Embodiments of the present disclosure relate to wheelchair control systems and methods, and particularly to a power wheelchair having a brake control system and a brake control method of the power wheelchair.

2. Description of Related Art

Attendant operated patient transport vehicles may be characterized as either a manual wheelchair type or a power wheelchair type with a joystick attendant control. Each of these transport vehicles has certain advantages and disadvantages. The manual brakes of a conventional manual wheelchair are located on the front of the manual wheelchair and designed as parking brakes. Frequently, the user fails to engage the parking brakes of a power wheelchair when the occupant is getting on or off of the power wheelchair and this may lead to further injuries. Furthermore, since the parking brakes are located on the front of the power wheelchair, the user cannot engage the parking brakes while the power wheelchair is in motion such as descending a ramp.

Therefore, there is a need to provide an improve power wheelchair having a brake control system and a brake control method of the power wheelchair, to address the foregoing mentioned problems.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of a non-transitory computer-readable medium include CDs, DVDs, flash memory, and hard disk drives.

Figure 1:
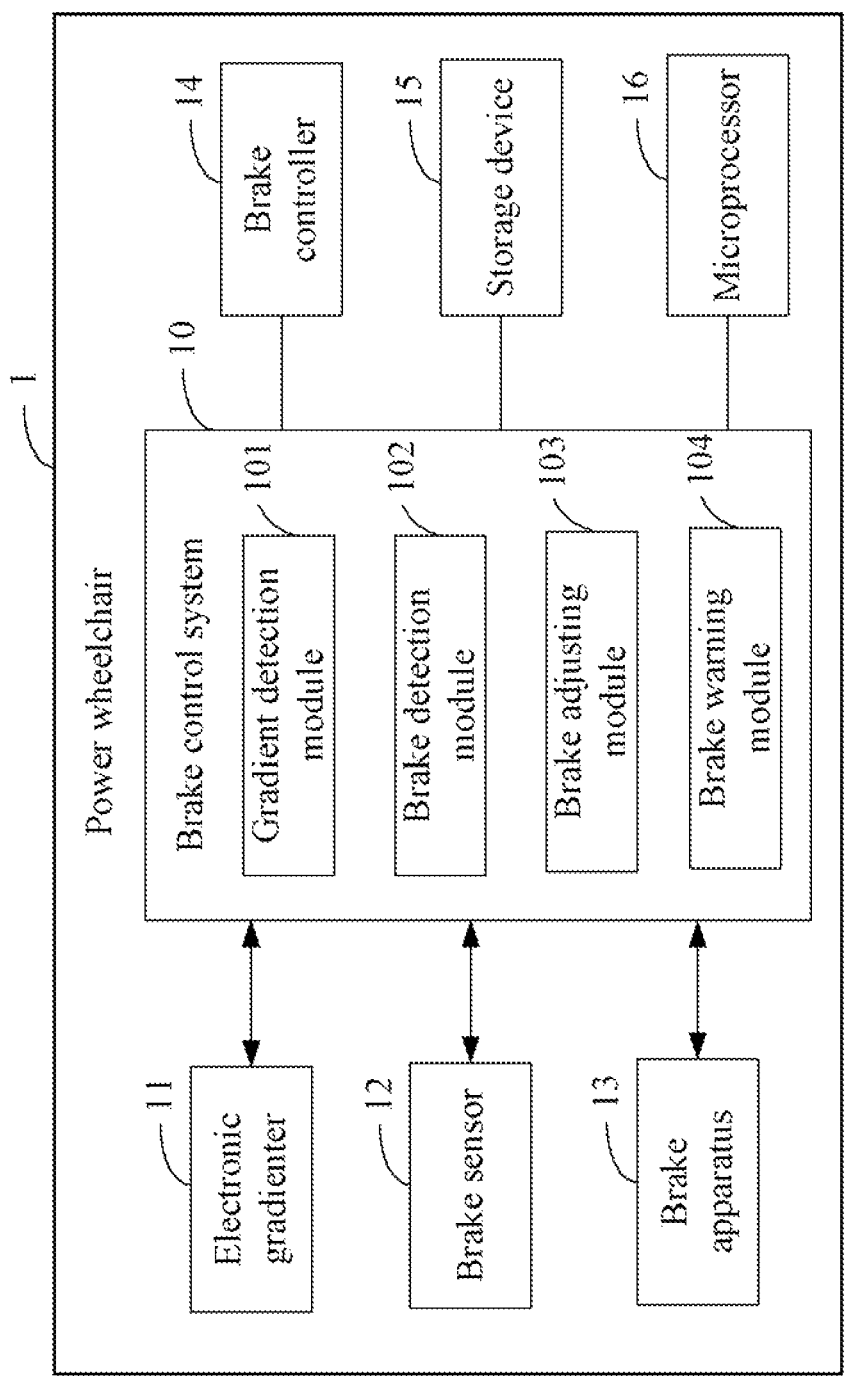
FIG. 1 is a block diagram of one embodiment of a power wheelchair including a brake control system.

FIG. 1 is a block diagram of one embodiment of a power wheelchair 1 including a brake control system 10. In the embodiment, the power wheelchair 1 further includes an electronic gradienter 11, a brake sensor 12, a brake apparatus 13, a brake controller 14, a storage device 15, and at least one microprocessor 16. Each of the components 11-16 electronically connects to the brake control system 10 though one or more data lines. The brake control system 10 may include a plurality of functional modules that are stored in the storage device 15 and executed by the at least one processor 16. FIG. 1 is only one example of the power wheelchair 1, other examples may include more or fewer components than those shown in the embodiment, or have a different configuration of the various components.

The electronic gradienter 11 is an attachment device including a gravity sensor that measures stability data of the power wheelchair 1 to determine whether the power wheelchair 1 is in a level driving state or an inclination driving state. In one embodiment, the stability data may include an inclination angle and an inclination direction of the power wheelchair 1.

The brake sensor 12 is a data sensor that obtains braking data of the power wheelchair 1 when the power wheelchair 1 is braked by the brake apparatus 13. In one embodiment, the braking data may include a braking strength value of each wheel of the power wheelchair 1 and a driving speed of the power wheelchair 1. The power wheelchair 1 may include a left front wheel, a right front wheel, a left rear wheel and a right rear wheel. The brake apparatus 13 brakes each of the wheels to adjust a driving speed of the power wheelchair 1 when the power wheelchair 1 is on an inclined surface.

The brake controller 14 controls the brake apparatus 13 to brake each of the wheels of the power wheelchair 1 using an oil pressure unit included in the brake apparatus 13. When the power wheelchair 1 is on an inclined surface, the brake controller 14 can adjust the driving speed of the power wheelchair 1 by braking each of the wheels using the brake apparatus 13.

In one embodiment, the storage device 15 may be an internal storage device, such as a random access memory (RAM) for temporary storage of information, and/or a read only memory (ROM) for permanent storage of information. In some embodiments, the storage device 15 may also be an external storage device, such as an external hard disk, a storage card, or a data storage medium.

In one embodiment, the brake control system 10 includes a gradient detection module 101, a brake detection module 102, a brake adjusting module 103, and a brake warning module 104. The modules 101-104 may comprise computerized instructions in the form of one or more programs that are stored in the storage device 15 and executed by the at least one microprocessor 16. Detailed descriptions of each module will be given in FIG. 2 as described in the following paragraphs.

Figure 2:
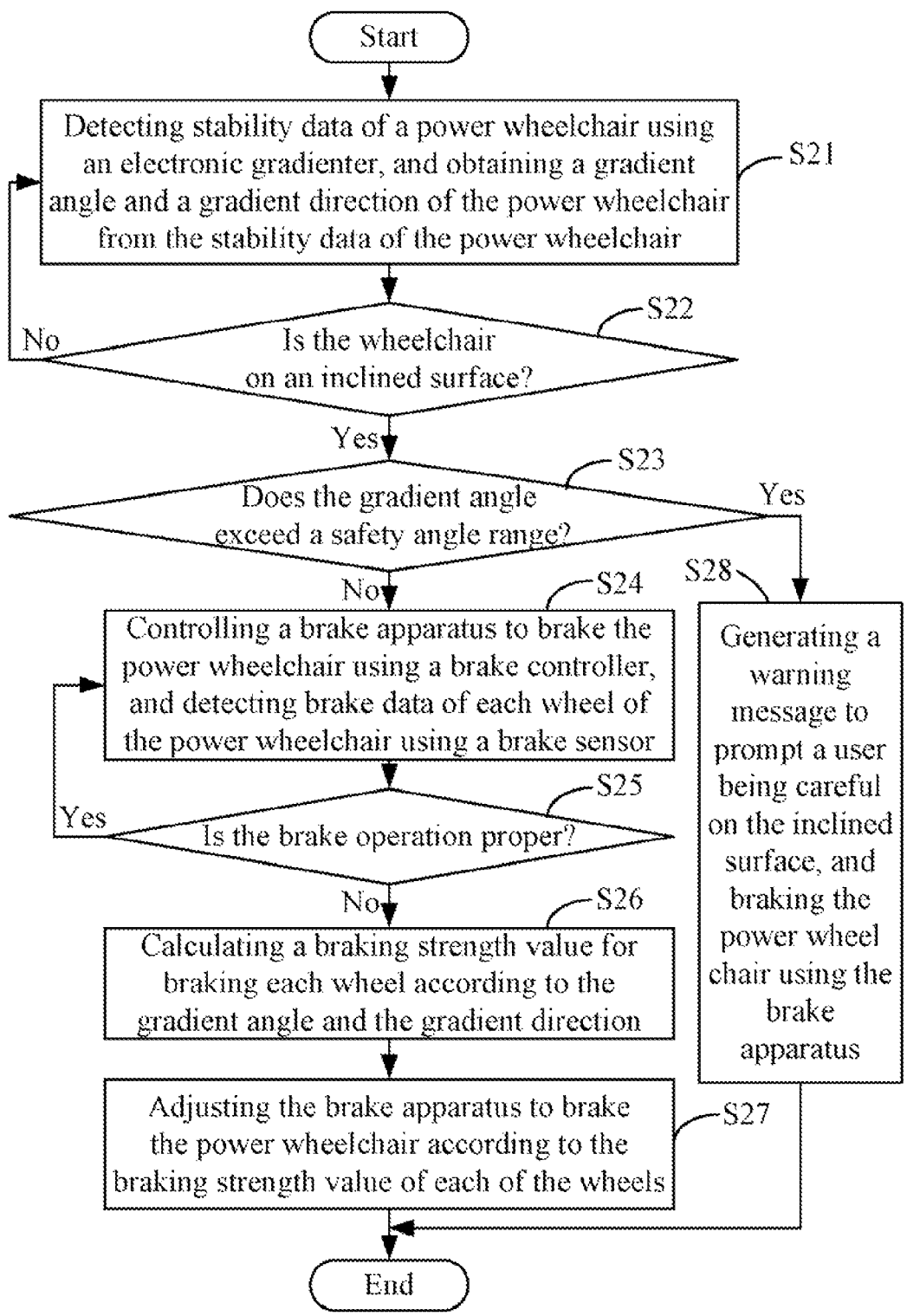
FIG. 2 is a flowchart of one embodiment of a brake control method of the power wheelchair of FIG. 1.

FIG. 2 is a flowchart of one embodiment of a brake control method of the power wheelchair 1 of FIG. 1. Depending on the embodiment, additional steps may be added, others removed, and the ordering of the steps may be changed.

In step S21, the gradient detection module 101 detects stability data of the power wheelchair 1 using the electronic gradienter 11, and obtains a gradient angle and a gradient direction of the power wheelchair 1 from the stability data of the power wheelchair 1. In the embodiment, the stability data of the power wheelchair 1 indicates a driving state of the power wheelchair 1. The driving state may be a level state representing that the power wheelchair 1 drives on a level surface, or an inclination state representing that the power wheelchair 1 drives on an inclined surface.

In step S22, the gradient detection module 101 determines whether the power wheelchair 1 is on an inclined surface according to the gradient angle of the power wheelchair 1. In one embodiment, the gradient detection module 101 determines that the power wheelchair 1 is on an inclined surface if the gradient angle is greater than zero, and determines that the power wheelchair 1 is not on an inclined surface if the gradient angle is equal to zero. If the power wheelchair 1 is on the inclined surface, step S23 is implemented. Otherwise, if the power wheelchair 1 is not on an inclined surface, the process returns to step S21.

Figure 3:
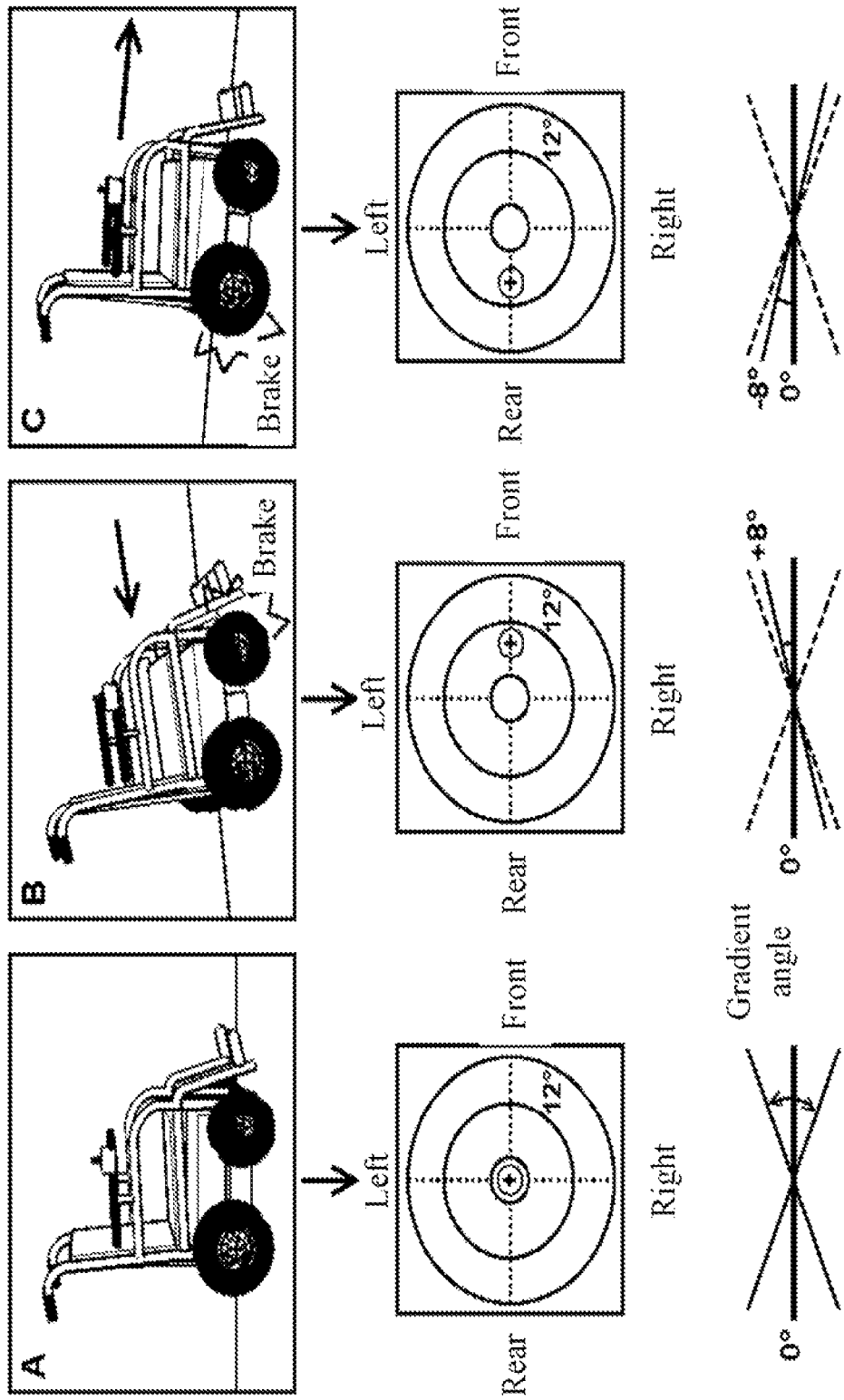
FIG. 3 is a schematic diagram illustrating examples for braking the power wheelchair when the gradient angle of the power wheelchair is within a safety angle range.

In step S23, the gradient detection module 101 determines whether the gradient angle of the power wheelchair 1 exceeds a safety angle range preset by a user. In one embodiment, the safety angle range is preset according to the requirements of the user. As shown in FIG. 3, the safety angle range is preset as an angle range from −12 degrees to +12 degrees, for example. If the gradient angle of the power wheelchair 1 does not exceed the preset safety angle range, step S24 is implemented. Otherwise, if the gradient angle of the power wheelchair 1 exceeds the preset safety angle range, step S28 is implemented.

In step S24, the brake detection module 102 controls the brake apparatus 13 to brake the power wheelchair 1 using the brake controller 14, and detects braking data of the power wheelchair 1 using the brake sensor 12. In one embodiment, the braking data may include a braking strength value of each wheel of the power wheelchair 1 and a driving speed of the power wheelchair 1. The power wheelchair 1 may include a left front wheel, a right front wheel, a left rear wheel and a right rear wheel.

In step S25, the brake detection module 102 determines whether the brake operation on the power wheelchair 1 is proper according to the braking data of the power wheelchair 1. If the brake operation on the power wheelchair 1 is proper, the process returns to step S24.

Otherwise, if the brake operation on the power wheelchair 1 is improper, step S26 is implemented.

In step S26, the brake adjusting module 103 calculates a proper strength value for braking each of the wheels of the power wheelchair 1 according to the gradient angle and the gradient direction of the power wheelchair 1. In one embodiment, the braking strength value of each of the wheels may be different from others. For example, the braking strength values of the left rear wheel and the right rear wheel are greater than the braking strength values of the left front wheel and the right front wheel.

In step S27, the brake adjusting module 103 adjusts the brake apparatus 13 to brake the power wheelchair 1 through the brake controller 14 according to the proper braking strength value of each of the wheels. Referring to FIG. 3, if the safety angle range is preset as a range from −12 degrees to 12 degrees, and if the gradient angle of the power wheelchair 1 is +8 degrees, the brake controller 14 controls the brake apparatus 13 to brake the left and right front wheels of the power wheelchair 1 according to the braking strength values of the left and right front wheels. If the gradient angle of the power wheelchair 1 is −8 degrees, and the brake controller 14 controls the brake apparatus 13 to brake the left and right rear wheels of the power wheelchair 1 according to the braking strength values of the left and right rear wheels.

Figure 4:
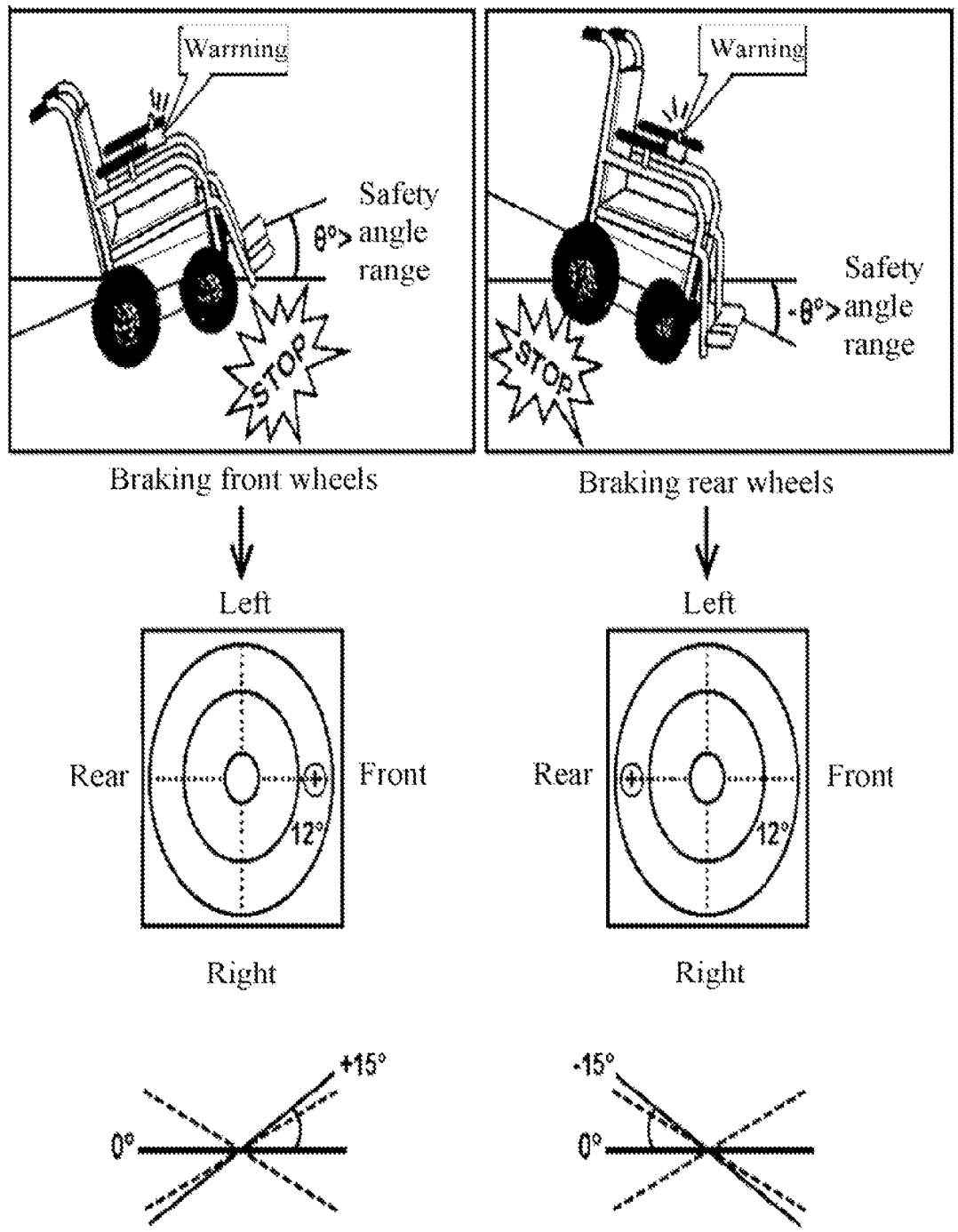
FIG. 4 is a schematic diagram illustrating examples for braking the power wheelchair when the gradient angle of the power wheelchair exceeds a safety angle range.

In step S28, the brake warning module 104 sends a warning message indicating that the user should be careful on the inclined surface, and controls the brake apparatus 13 to brake each of the wheels of the power wheelchair 1 through the brake controller 14. Referring to FIG. 4, if the gradient angle of the power wheelchair 1 is −15 degrees or +15 degrees, the gradient detection module 101 determines that the gradient angle of the power wheelchair 1 exceeds the preset safety angle range. Then the brake warning module 104 sends the warning message indicating that the power wheelchair 1 may be driving over an inclined surface that is beyond the safety limit, and prompts the user to be careful on the inclined rode.

Then the brake warning module 104 controls the brake apparatus 13 to brake the front wheels of the power wheelchair 1 when the gradient angle of the power wheelchair 1 is +15 degrees, and controls the brake apparatus 13 to brake the rear wheels of the power wheelchair 1 when the gradient angle of the power wheelchair 1 is −15 degrees.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A power wheelchair, comprising:
   an electronic gradienter, a brake sensor, a brake apparatus, and a brake controller;
   a storage device, and at least one microprocessor; and
   a brake control system stored in the storage device and executed by the at least one microprocessor, the brake control system comprising:
   a gradient detection module that detects stability data of the power wheelchair using the electronic gradienter, obtains a gradient angle and a gradient direction of the power wheelchair from the stability data of the power wheelchair, determines whether the power wheelchair is on an inclined surface according to the gradient angle of the power wheelchair, and determines whether the gradient angle exceeds a safety angle range preset by a user if the power wheelchair is on the inclined surface;
   a brake detection module that controls the brake apparatus to brake the power wheelchair using the brake controller if the gradient angle does not exceed the safety angle range, detects braking data of the power wheelchair using the brake sensor, and determines whether the brake operation on the power wheelchair is proper according to the braking data of the power wheelchair; and
   a brake adjusting module that calculates a braking strength value for braking each wheel of the power wheelchair according to the gradient angle and the gradient direction of the power wheelchair when the brake operation on the power wheelchair is improper, and adjusts the brake apparatus to brake the power wheelchair using the brake controller according to the braking strength value of each of the wheels.

2. The power wheelchair according to claim 1, wherein the brake control system further comprises a brake warning module that generates a warning message indicating that the user should be careful on the inclined surface if the gradient angle exceeds the safety angle range, and controls the brake apparatus to brake each wheel of the power wheelchair through the brake controller.

3. The power wheelchair according to claim 1, wherein the electronic gradienter is an attachment device including a gravity sensor that measures the stability data of the power wheelchair to determine whether the power wheelchair is in a level state or an inclination state.

4. The power wheelchair according to claim 1, wherein the brake controller controls the brake apparatus to brake each of the wheels of the power wheelchair using an oil pressure unit included in the brake apparatus.

5. The power wheelchair according to claim 1, wherein the brake sensor is a data sensor that obtains the braking data of the power wheelchair when the power wheelchair is braked by the brake apparatus, and the braking data comprise the braking strength value of each wheel of the power wheelchair and a driving speed of the power wheelchair.

6. The power wheelchair according to claim 1, wherein the brake detection module determines whether the brake operation on the power wheelchair is proper by checking if the braking strength value of rear wheels of the power wheelchair is greater than the braking strength value of front wheels of the power wheelchair.

7. A brake control method of a power wheelchair, the power wheelchair comprising an electronic gradienter, a brake sensor, a brake apparatus, and a brake controller, the brake control method comprising:
   detecting stability data of the power wheelchair using the electronic gradienter, and obtaining a gradient angle and a gradient direction of the power wheelchair from the stability data of the power wheelchair;
   determining whether the power wheelchair is on an inclined surface according to the gradient angle of the power wheelchair;
   determining whether the gradient angle exceeds a safety angle range preset by a user when the power wheelchair is on the inclined surface;
   controlling the brake apparatus to brake the power wheelchair using the brake controller and detecting braking data of the power wheelchair using the brake sensor, if the gradient angle does not exceed the safety angle range;
   determining whether the brake operation on the power wheelchair is proper according to the braking data of the power wheelchair;
   calculating a braking strength value for braking each wheel of the power wheelchair according to the gradient angle and the gradient direction of the power wheelchair if the brake operation on the power wheelchair is improper; and
   automatically adjusting the brake apparatus to brake the power wheelchair using the brake controller according to the braking strength value of each of the wheels.

8. The method according to claim 7, further comprising:
   generating a warning message indicating that the user should be careful on the inclined surface if the gradient angle exceeds the safety angle range; and
   controlling the brake apparatus to brake each wheel of the power wheelchair through the brake controller.

9. The method according to claim 7, wherein the electronic gradienter is an attachment device including a gravity sensor that measures the stability data of the power wheelchair to determine whether the power wheelchair is in a level state or an inclination state.

10. The method according to claim 7, wherein the brake controller controls the brake apparatus to brake each of the wheels of the power wheelchair using an oil pressure unit included in the brake apparatus.

11. The method according to claim 7, wherein the brake sensor is a data sensor that obtains the braking data of the power wheelchair when the power wheelchair is braked by the brake apparatus, and the braking data comprise the braking strength value of each wheel of the power wheelchair and a driving speed of the power wheelchair.

12. The method according to claim 7, wherein whether the brake operation on the power wheelchair is determined by checking if the braking strength value of rear wheels of the power wheelchair is greater than the braking strength value of front wheels of the power wheelchair.

13. A non-transitory storage medium having stored thereon instructions that, when executed by at least one microprocessor of a power wheelchair, causes the microprocessor to perform a brake control method of the power wheelchair, the power wheelchair comprising an electronic gradienter, a brake sensor, a brake apparatus, and a brake controller, the brake control method comprising:
   detecting stability data of the power wheelchair using the electronic gradienter, and obtaining a gradient angle and a gradient direction of the power wheelchair from the stability data of the power wheelchair;
   determining whether the power wheelchair is on an inclined surface according to the gradient angle of the power wheelchair;
   determining whether the gradient angle exceeds a safety angle range preset by a user when the power wheelchair is on the inclined surface;
   controlling the brake apparatus to brake the power wheelchair using the brake controller and detecting braking data of the power wheelchair using the brake sensor, if the gradient angle does not exceed the safety angle range;
   determining whether the brake operation on the power wheelchair is proper according to the braking data of the power wheelchair;
   calculating a braking strength value for braking each wheel of the power wheelchair according to the gradient angle and the gradient direction of the power wheelchair if the brake operation on the power wheelchair is improper; and
   automatically adjusting the brake apparatus to brake the power wheelchair using the brake controller according to the braking strength value of each of the wheels.

14. The storage medium according to claim 13, wherein the method further comprises:
   generating a warning message indicating that the user should be careful of the inclined surface if the gradient angle exceeds the safety angle range; and
   controlling the brake apparatus to brake each wheel of the power wheelchair through the brake controller.

15. The storage medium according to claim 13, wherein the electronic gradienter is an attachment device including a gravity sensor that measures the stability data of the power wheelchair to determine whether the power wheelchair is in a level state or an inclination state.

16. The storage medium according to claim 13, wherein the brake controller controls the brake apparatus to brake each of the wheels of the power wheelchair using an oil pressure unit included in the brake apparatus.

17. The storage medium according to claim 13, wherein the brake sensor is a data sensor that obtains the braking data of the power wheelchair when the power wheelchair is braked by the brake apparatus, and the braking data comprise the braking strength value of each wheel of the power wheelchair and a driving speed of the power wheelchair.

18. The storage medium according to claim 13, wherein the brake operation on the power wheelchair is determined by checking if the braking strength value of rear wheels of the power wheelchair is greater than the braking strength value of front wheels of the power wheelchair.

* * * * *